United States Patent [19]

Barsotti et al.

[11] Patent Number: 5,367,004
[45] Date of Patent: Nov. 22, 1994

[54] AMBIENT CURING WATER-BORNE COMPOSITIONS COMPRISING HALF ESTERS OF ANHYDRIDE POLYMERS CROSSLINKED BY EPOXIES

[75] Inventors: Robert J. Barsotti, Franklinville, N.J.; Lee R. Harper, Media; Michele R. Lock, Willow Grove, both of Pa.

[73] Assignee: E. I. du Pont de Nemours and Company, Wilmington, Del.

[21] Appl. No.: 977,864

[22] Filed: Nov. 17, 1992

[51] Int. Cl.$^5$ .................... C08G 59/42; C08L 63/00; C08L 43/00; C08L 31/06

[52] U.S. Cl. ................... 523/414; 524/417; 524/439; 525/117

[58] Field of Search ............ 523/414, 417, 439; 525/117

[56] References Cited

U.S. PATENT DOCUMENTS

| | | | |
|---|---|---|---|
| 4,247,439 | 1/1981 | Matthews | 523/414 |
| 4,600,737 | 7/1986 | Georgalas | 523/414 |
| 4,871,806 | 10/1989 | Shalati | 525/117 |
| 4,908,397 | 3/1990 | Barsotti | 523/439 |

FOREIGN PATENT DOCUMENTS

| | | |
|---|---|---|
| 353734 | 7/1990 | European Pat. Off. |
| 450903 | 9/1991 | European Pat. Off. |

*Primary Examiner*—John C. Bleutge
*Assistant Examiner*—D. R. Wilson
*Attorney, Agent, or Firm*—Chris P. Konkol

[57] ABSTRACT

An ambient cured aqueous coating composition useful for maintenance coatings for architectural structures or for a finish or refinish for automobiles and trucks. The film-forming binder comprises a neutralized half-ester product of an acrylic polymer having at least two reactive anhydride groups and an epoxy-containing, optionally silane-containing crosslinker. The composition may be used as a mulit-package system. The composition is characterized by improved environmental resistance and excellent clarity and appearance, particularly for clearcoats.

14 Claims, No Drawings

AMBIENT CURING WATER-BORNE COMPOSITIONS COMPRISING HALF ESTERS OF ANHYDRIDE POLYMERS CROSSLINKED BY EPOXIES

FIELD OF THE INVENTION

This invention is related to a multi-component waterborne coating composition comprising a half-ester of an anhydride polymer and an epoxy crosslinking agent.

BACKGROUND

There are a wide variety of multi-component coating compositions available for finishing automobiles and trucks. Various coating compositions comprising anhydride or epoxy containing compositions are known. For example, U.S. Pat. No. 4,906,677 discloses a composition comprising an acrylic anhydride polymer, a glycidyl component, and a phosphonium catalyst. U.S. Pat. No. 3,136,736 and British patent 994,881 disclose coating compositions comprising polyepoxides and maleic anhydride copolymers. U.S. Pat. No. 4,732,791 concerns a coating composition comprising a polyepoxide, a monomeric anhydride curing agent, and a hydroxyl containing polyfunctional polymer.

U.S. Pat. No. 4,906,677, in column 4, lines 40-47, discloses that anhydride polymers, in epoxy-anhydride compositions, may be converted to a half-ester by alcohol solvents.

European Patent Application, publication no. 0 353 734 A2, published 07.02.90 and European Patent Application, publication no. 0 450 63 A1, published 09.10.91 both disclose the combination of a polymer having a half-esterified acid anhydride group and a compound having an epoxy group and a hydroxy group, or a separate epoxy and hydroxy compound. These patents teach that, in such compositions, high temperature curing is required in order that the half-esterified acid anhydride groups are ring-closed to produce acid anhydride groups which then react with hydroxyl groups, which in turn release carboxyl groups which then react with the epoxy groups. These patents indicate that a certain hydroxy equivalent number or hydroxy value is necessary for adequate water resistance of the coating composition.

The afore-mentioned EP 0 353 734 A2 states that water can be used as a "diluent" if the carboxyl groups are neutralized with an amine. In contrast, the present invention is directed to compositions in which water is employed as the primary carrier, organic solvents being possible diluents. The afore-mentioned EP 0 450 963 A1 states that the half esterified polymer may be neutralized with amines to make a hydrophilic polymer which can form an aqueous composition. The examples, however, all disclose compositions which employ organic solvents.

A problem with present coating compositions for automobiles and trucks, or parts thereof, is that durability is not as good as desired. An important aspect of durability is environmental resistance. The present invention offers a high quality finish exhibiting superior environmental resistance at lower cost. This is particularly noteworthy given the fact that the present composition is a waterborne finish.

The present composition is a multi-package system, having use in refinish, maintenance, and low temperature cured systems. Such a coating composition exhibits excellent clarity, appearance and environmental resistance. Importantly, such compositions offer a low VOC (volatile organic content) since the binder is waterborne employing an aqueous (primarily water) carrier.

SUMMARY OF THE INVENTION

The present invention is directed to an ambient or low-temperature curing coating composition containing 20-80% by weight of binder components and 80-20% by weight of an aqueous carrier which is primarily water. The binder contains (a) a half-ester of an anhydride polymer having at least two anhydride groups and having a weight average molecular weight of about 2,000-100,000;

(b) an epoxy component having at least two reactive glycidyl groups; and (c) an basic compound to neutralize the half ester.

Optionally, these compositions may also include epoxy-silane polymers, silane polymers, acid polymers, lower molecular weight polyester or polyester urethanes, reelamine resins, hydroxyl polymers, acrylic latices, waterborne urethane emulsions or dispersions, and combinations thereof.

The present invention is also directed to a process in which applicant's composition is applied to a substrate as an automotive topcoat refinish.

DETAILED DESCRIPTION OF THE INVENTION

The composition of the present invention forms a durable environmental resistant coating. The composition is especially useful for maintenence coating of architectural structures and for finishing the exterior of automobiles and trucks.

The composition can also be pigmented to form a colored finish, although the composition is particularly useful as a clearcoat.

Preferably, the coating composition has a high solids content and contains about 20-80% by weight binder and 20-80% by weight aqueous carrier. The binder of the composition contains about 25-90%, preferably 35 to 65% (by weight of binder) of the half-ester of an arthydride polymer containing at least two anhydride groups; 5-50%, preferably 15 to 30% (by weight of binder) of a glycidyl or epoxy containing component.

Optionally, the composition may comprise 5-50%, preferably 10 to 25% by weight of binder of an acrylic or a polyester or polyester urethane which may contain hydroxyl and/or acid functionality. If hydroxy functional, the hydroxy number is 20 to 120. If acid functional, the acid number is 20 to 120.

The anhydride polymer employed in preparing the present composition has a weight average molecular weight of about 2000-100,000, determined by gel permeation chromatography using polymethyl methacrylate as a standard. Preferably the anhydride polymer has a weight average molecular weight of 3,000-50,000.

The arthydride polymer may be prepared by conventional techniques in which the monomers, solvent, and conventional catalysts such as t-butyl perbenzoate are charged into a polymerization vessel and heated to about 75°-200° C. for about 0.5-6 hours to form the polymer.

The anhydride acrylic polymer is preferably an acrylic copolymer formed by polymerizing a mixture of monomers comprising alkyl methacrylates and/or alkyl acrylates, where the alkyl groups have 1-12 (preferably 1-8) carbon atoms, and ethylenically unsaturated anhydrides (or ethylenically unsaturated dicarboxylic acids which are converted to the acid anhydride during the polymerization). Optionally, the anhydride acrylic polymer can contain other components such as styrene, methyl styrene, acrylonitrile, and/or methacrylonitrile in amounts of about 0.1–50% by weight.

Typical alkyl acrylates and methacrylates that can be used to form the anhydride acrylic polymer are methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate, and the like, or any others mentioned below. Other components that can be used to form the anhydride acrylic polymer are acrylamide, methacrylamide, and acrylo alkoxy silanes such as gamma- methacryloxyl propyl trimethoxy silane. Also, the anhydride acrylic polymer can contain about 0.1–5% by weight of an ethylenically unsaturated acid such as acrylic acid, methacrylic acid, itaconic acid, maleic acid, and the like.

Typically useful ethylenically unsaturated anhydrides are itaconic anhydride, maleic anhydride, isobutenyl succinic anhydride, and the like. As stated above, it is also possible to impart the anhydride functionality to the anhydride acrylic polymer by using an ethylenically unsaturated dicarboxylic acid which converts to the acid anhydride during the reaction. Suitable ethylenically unsaturated dicarboxylic acids that can be used are itaconic acid, maleic acid, isobutenyl succinic acid, and the like.

A preferred anhydride acrylic polymer comprises styrene, butyl methacrylate, butyl acrylate, and itaconic anhydride. Another preferred polymer comprises methyl methacrylate, butyl acrylate, and itaconic anhydride. Another preferred polymer comprises styrene, isobornyl methacrylate, butyl acrylate, and maleic anhydride.

The anhydride polymer is half-esterified with an alcohol. Suitable alcohols include methanol, ethanol, propanol, butanol; ethyleneglycol monoalkyl ether, dialkylaminoethanol, in which particularly common alkyl groups are methyl and ethyl; acetol, allyl alcohol, propargyl alcohol, tetrahydrofurfuryl alcohol; and the like. The reaction to produce the half-ester is generally at ambient or elevated temperatures, suitably in the range of 20° to 150° C. Such a reaction may be conducted in the presence of a catalyst, for example, tertiary amines such as triethylamine, quaternary ammonium salts such as benzyltrimethyl ammonium chloride, and the like.

For utility in the aqueous carrier, the anhydride polymer, after it is converted to the half-ester, is neutralized with a base. Suitable bases include amines which are volatile under the conditions of cure. Typical amines are triethyl amine, trimethyl amine, ammonia, and dimethyl ethanolamine. Other bases include sodium hydroxide, potassium hydroxide and the like. The base is suitably used in the amount of 0.1 to 10 percent by weight of binder to solublilize or disperse the half ester in the aqueous carrierr.

The epoxy component preferably contains at least two glycidyl groups and can be an oligomer or a polymer. Typical glycidyl components are sorbitol polyglycidyl ether, mannitol polyglycidyl ether, pentaerythritol polyglycidol ether, glycerol polyglycidyl ether, low molecular weight epoxy resins such as epoxy resins of epichlorohydrin and hisphenol A, di- and polyglycidyl esters of acids, polyglycidyl ethers of isocyanurates, such as Denecol EX301 ® from Nagase. Sorbitol polyglycidyl ethers, such as DCE-358 ® from Dixie Chem. Co., and di- and polyglycidyl esters of acids, such as Araldite CY-184 ® from Ciba-Geigy or XUS-71950 ® from Dow Chemical form high quality finishes. Cycloaliphatic epoxies such as CY-179 ® from Ciba-Geigy may also be used. Generally, the choice of epoxy is chosen for room temperature reactivity and the extent of cure with the half ester. Ambient curing means that the composition cures at 10° to 90° C., preferably 15° to 60° C. within a couple of weeks, preferably one week.

Glycidyl methacrylate or acrylate containing acrylic polymers can be used, such as random and block polymers of glycidyl methacrylate/butyl methacrylate. The block polymers can be prepared by anionic polymerization or by group transfer polymerization. Optionally, the composition may further comprise a copolymer having both epoxy and alkoxy silane groups, prepared as the reaction product of epoxy monomers such as glycidyl methacrylate and silane monomers as described below.

Optionally the present composition may comprise a silane polymer as a separate additional ingredient or component. Such silane polymers may suitably have a weight average molecular weight of about 1000–30,000, a number average molecular weight of about 500–10,000. (All molecular weights disclosed herein are determined by gel permeation chromatography using a polystyrene standard.)

As indicated above, the binder of the present composition may comprises from about 5 to 50%, preferably 10 to 25%, based on the weight of the binder, of an acrylic or polyester or polyester urethane or copolymer thereof having a hydroxy number of about 20 to 120, preferably 70 to 100, or an acid number of about 20 to 120, preferably 75 to 95. This polymer has a weight average molecular weight of about 2,000 to 20,000, preferably 4,000–10,000. Unless otherwise indicated, all molecular weights mentioned herein are measured using gel permeation chromatography using polymethyl methacrylate as a standard.

Polyester urethanes are a reaction product of a hydroxyl terminated polyester component and a polyisocyanate component, preferably, an aliphatic or cycloaliphatic diisocyanate. The polyester, which may be used alone or as a component of the polyester urethane, may be suitably prepared from linear or branched chain diols, including ether glycols, or mixtures thereof or mixtures of diols and triols, containing up to and including 8 carbon atoms, or mixtures of such diols, triols, and polycaprolactone polyols, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid.

Representative saturated and unsaturated polyols that can be reacted to form a polyester include alkylene glycols such as neopentyl glycol, ethylene glycol, propylene glycol, butane diol, pentane diol, 1,6-hexane diol, 2,2-dimethyl- 1,3-dioxolane-4-methanol, 1,4-cyclohexane dimethanol, 2,2-dimethyl 1,3-propanediol, 2,2-bis(-hydroxymethyl)propionic acid, and 3-mercapto-1,2-propane diol. Preferred are 1,6-hexanediol and butylene glycol.

Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

Polycaprolacone polyols may be also be used in making the polyester. A preferred polycaprolactone, a triol, is Tone® FCP 310 (available from Union Carbide).

The carboxylic acids used in making the polyester component of the polyester urethane include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid, 1,3 or 1,4-cyclohexane dicarboxylic acid and the like. A preferred acid is adipic acid. Aromatic polycarboxylic acids include phthalic acid, isophthalic acid, terephthalic acid, and the like. Arthydrides may also be used, for example, maleic arthydride, phthalic anhydride, trimellitic anhydride, and the like.

Typical polyisocyanates that may be used to form the polyester urethane are as follows: isophorone diisocyanate which is 3-isocyanatemethyl-3,5,5-trimethyl-cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethlyene diisocyanate, 2,4,4-trimethylhexamethylene diisocyanate, nonamethylene diisocyante, 2,2,4-trimethylhexamethylene diisocyanate, decamethylene diisocyanate, 2,11-diisocyano-dodecane and the like, meta-phenylene diisocyanate, para-phenylene diisoxyanate, toluene-2,4-diisocyanate, toluene-2,6-diisocyanate, xylene-2,4-diisocyanate, xylene-2,6-diisocyanate, dialkyl benzene diisocyanates, such as methylpropylbenzene diisocyanate, methylethylbenzene diisocyanate, and the like: 2,2'-biphenylene diisocyanate, 3,3'-biphenylene diisocyanate, 4,4'-biphenylene diisocyanate, 3,3'-dimethyl-4,4'-biphenylene diisocyanate, and the like; methylene-bis(4-phenyl isocyanate), ethylene-bis(4-phenyl isocyanate), isopropylidene-bis(4-phenyl isocyanate), butylene-bis(4-phenylisocyanate), and the like; 2,2'-oxydiphenyl diisocyanate, 3,3'-oxydiphenyl diisocyanate, 4,4'-oxydiphenyl diisocyanate, 2,2'-ketodiphenyl diisocyanate, 3,3'-ketodiphenyl diisocyanate, 4,4'-ketocliphenyl diisocyanate, 2,2'-thiodiphenyl diisocyanate, 3,3'-thiodiphenyl diisocyanate, 4,4'-thiodiphenyl diisocyanate, and the like; 2,2'-sulfonediphenyl diisocyanate, 3,3 '-sulfonediphenyl diisocyanate, 4,4'-sulfonediphenyl diisocyanate, and the like; 2,2,-methylene-bis(cyclohexyl isocyanate), 3,3'-methylene-bis(cyclohexyl isocyanate), 4,4'-methylene-bis(cyclohexyl isocyanate), 4,4'-ethylene-bis(cyclohexyl isocyanate), 4,4'-propylene-bis-(cyclohexyl isocyanate), bis(paraisocyano-cyclohexyl)sulfide, bis(para-isocyano-cyclohexyl)sulfone, bis(para-isocyano-cyclohexyl)ether, bis(para-isocyano-cyclohexyl)diethyl silane, bis(para-isocyano-cyclohexyl)diphenyl silane, bis(para-isocyano-cyclohexyl)ethyl phosphine oxide, bis(para-isocyano-cyclohexyl)phenyl phosphine oxide, bis(para-isocyano-cyclohexyl)N-phenyl amine, bis(para-isocyano-cyclohexyl)N-methyl amine, 3,3'-dimethyl-4,4'-diisocyano biphenyl, 3,3'-dimethoxy-biphenylene diisocyanate, 2,4-bis(b-isocyano-t-butyl)toluene, bis(para-b-isocyano-t-butyl-phenyl)ether, para-bis(2-methyl-4-isocyanophenyl)benzene, 3,3-diisocyano adamantane, 3,3-diisocyano biadamantane, 3,3-diisocyanoethyl-1'-biadamantane, 1,2-bis(3-isocyano-propoxy)ethane, 2,2-dimethyl propylene diisocyanate, 3-methoxy-hexamethylene diisocyanate, 2,5-dimethyl heptamethylene diisocyanate, 5-methyl-nonamethylene diisocyanate, 1,4-diisocyano-cyclohexane, 1,2-diisocyano-octadecane, 2,5-diisocyano-1,3,4-oxadiazole, OCN(CH$_2$)$_3$O(CH$_2$)$_2$O(CH$_2$)$_3$NCO, OCN(CH$_2$)$_3$NCO or the following:

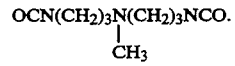

Aliphatic diisocyanates are preferred, forming urethanes that have excellent weatherability. One aliphatic diisocyanate that is particularly preferred is trimethyl hexamethylene diisocyanate.

A preferred polyester urethane is the reaction product of trimethylhexamethylene diisocyanate and a hydroxy terminated polyester of 1,3-butylene glycol, 1,6-hexanediol, adipic acid, trimethylolpropane, and Tone® FCP 310.

It is noted that a hydroxy functional polyester urethane can be converted to the corresponding acid functional polyester urethane by reaction with methylhexahydropthalic anhydride or other mono-anhydride such as succinic arthydride. Converting the hydroxy to the acid may result in longer pot life in the clearcoat.

A polyester may be prepared by conventional techniques in which the component polyols and carboxylic acids and solvent are esterified at about 110° C.–250° C. for about 1–10 hours to form a polyester. To form a polyester urethane, a diisocyanate may then be added and reacted at about 100° C. for about 15 minutes to 2 hours.

In preparing the polyester urethane, a catalyst is typically used. Conventional catalysts include benzyl trimethyl ammonium hydroxide, tetramethyl ammonium chloride, organic tin compounds, such as dibutyl tin diaurate, dibutyl tin oxide stannous octoate and the like, titanium complexes and litharge. About 0.1–5% by weight of catalyst, based on the total weight of the reactants, is typically used.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in commonly assigned U.S. Pat. No. 4,810,59, hereby incorporated by reference.

Another optional component are acrylic latices such as Neocryl® available from ICI. Other latices are available from ICI and Rohm & Haas. Another optional component are urethane dispersions or emulsions such as Neorez®9699 and the like from ICI or Spensol L-52® from Reichold. Other suppliers are Witco, American Cyanamid, and Sanncor. Such dispersions include polyethers, polyesters, polycarbonates, or combinations thereof.

An acid resin is optionally added to the coating composition. The acid functional material can be formed by polymerizing monomers of alkyl methacrylates, or alkyl acrylates or mixtures thereof, where the alkyl groups have 1–12 carbon atoms and ethylenically unsaturated acids. Optionally, the acid functional polymer can also contain other components such as styrene, methyl styrene, and/or acrylonitrile, methacrylonitrile in amounts of about 0.1–50% by weight.

Typical alkyl acrylates, methacrylates, and other components that can be used to form the acid functional polymer are the same as those listed above with respect to the anhydride polymer, Typically useful ethylenically unsaturated acids are acrylic acid, methacrylic acid, itaconic acid, maleic acid, and the like.

This acid resin may also contain hydroxyl functionality by using monomers such as hydroxyethylacrylate, hydroxyethyl methacrylate and hydroxypropyl acrylate. The hydroxy functionality may be introduced by a post reaction of the acid with epoxy containing compounds such as Cardura E® from Shell Chemical Company (a glycidyl ester of versatic acid) and propylene oxide.

Another optional component of the present composition is the half ester of an anhydride compound, as distinguished from a polymer, for example the reaction product of an acid anhydride such as hexahydropthalic anhydride or a succinic anhydride, which may be substituted, for example with a $C_1$–$C_8$ alkyl group, with a monofuntctional or polyfunctional alcoholic solvent such as methanol or ethylene glycol. A preferred half ester is the reaction product of methylhexahydrophthalic anhydride and an alcohol such as ethylene glycol. Other alcoholic solvents are propanol, isobutanol, isopropanol, tertiary butanol, n-butanol, propylene glycol monomethyl ether, ethylene glycol monobutyl ether, and the like. The half ester is suitably present in the amount of 2 to 25 percent by weight of binder, preferably 4–12 percent.

About 0.1–8% (preferably 0.5 to 5%) by weight, based on the weight of the binder of the coating composition, of a catalyst is added to enhance curing of the composition. Typical catalysts are as follows: tertiary amines such as triethylene diamine, quinuclidine, dialkyl alkanol amines such as dimethyl ethanolamine, diethyl ethanol amine, dibutyl ethanol amine, diethyl hexanol amine, triethylamine bisdimethylaminoethyl ether (available from Union Carbide), diazabicyclo[5.4.0]undec-7-ene, 1,5-diazabicyclo[4.3.0]non-5-ene, and the like, lithium tertiary butoxide, tri(dimethylaminomethyl)phenol, bis(dimethylamino)propan-2-ol, N,N,$N^1$,$N^1$-tetramethylethylenediamine, N-methyldiethanolamine, N,N-dimethyl-1,3-propanediamine and 1-dimethylamino-2-propanol. Tertiary amines and bicyclic tertiary amines are preferred catalysts.

Typical solvents used to prepare the anhydride acrylic polymer or used as a diluent for the coating composition include toluene, xylene, butyl acetate, butyl proprionate, ethyl benzene, higher boiling aromatic hydrocarbons, amyl acetate, ethyl acetate, propyl acetate, ethylene or propylene glycol mono alkyl ether acetates.

The solvent for the final composition, as sold or applied, comprises primarily water. Suitably at least 60 percent of the liquid carrier, preferably 70 percent by weight is water. Preferably deionized water is employed. Optional diluents for the water include butyl acetate, butyl proprionate, mono- and di- ethers of proplyene glycol, and butyl cellosolve.

Generally, the present composition is applied as a coating to a substrate by conventional techniques such as spraying. The composition may be applied as a multi-package system. Multi-package means that at least some of the components are kept separate until shortly before their application. For instance, the glycidyl component must be kept seperate from the half ester and optional acid components. The resulting coating can be dried and cured at elevated temperatures of 5° to 90° C., preferably 15 to 60° C. Coatings are applied to form a finish typically about 0.5–5 mils thick, and preferably 1–2 mils thick.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are listed in U.S. Pat. No. 4,906,677, previously incorporated by reference. Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate (5)]-Ni, bis[phenyldithiocarbamato]-Ni(II), and others listed in the above patent, column 8, line 44 through line 55.

An applicable blend of ultraviolet light stabilizers comprises 2-[2'-hydroxy-3',5'-1(1-1-dimethyl-propyl)-phenyl]benzotrizole and bis-[4-( 1,2,2,6,6-pentamethyl-piperidyl)]2-butyl-2-[(3,5-t-butyl-4-hydroxyphenyl)methyl]propanedioate. Although the stabilizers can be employed in any ratio, a 1:1 ratio of benzotriazole to propanedioate is preferred.

The composition can be applied over a pigmented or colored basecoat finish. If over a waterborne basecoat, the basecoat is typically first allowed to dry. Basecoats suitably comprise conventional pigments, optionally metallic flake or the like, which can be made using conventional techniques in which a mill base containing pigment, dispersant and solvent or carrier is first formed.

The present coating composition can be applied over both solvent- and water borne basecoats.

The present composition can be pigmented to form a colored finish such as a primer, basecoat, monocoat, or maintenence paint. About 0.1–200 percent by weight, based on the weight of the binder, of conventional pigments can be added using conventional techniques in which a mill base containing pigment, dispersant and carrier is first formed. The mill base is then mixed with the composition to form a colored composition.

The following examples illustrate the invention. All parts and percentages are on a weight basis unless otherwise indicated. The weight average molecular weight of polymers was determined by GPC (gel permeation chromatography) using polyethyl methacrylate as a standard, unless stated otherwise.

EXAMPLE 1

This example illustrates the preparation of a half ester of a maleic anhydride polymer, specifically the half ester of a styrene/isobornyl methacrylate/butyl acrylate/maleic anhydride copolymer. The anhydride polymer was first prepared, as follows. To a reactor, heated to reflux, equipped with a condenser, stirrer, nitrogen purge, feed system, heating mantle, were added, as Part I, 1384.86 parts of butylpropionate. The following Part II was premixed and then fed to the reactor over four hours. The next following Part III was added to the reactor over 30 minutes, held for 30 minutes.

|  | Parts by Weight |
|---|---|
| Part II | |
| Styrene monomer | 1081.92 |
| Isobornyl methacrylate | 735.71 |
| Butyl acrylate | 1773.05 |
| Maleic anhydride | 735.71 |
| Butyl propionate | 2077.29 |
| Tertiary butyl peroxyacetate | 259.66 |
| Part III | |
| Tertiary butyl peroxyacetate | 19.04 |
| Butyl proprionate | 138.00 |
| TOTAL | 8205.24 |

After the 30 minute holding period, a total of 1090 parts by weight of solvent is stripped off, resulting in a yield of 7115.24 parts by weight.

The product polymer had a Gardner-Holdt viscosity of V and a measured solids of 62.84%. The actual molecular weight was measured by gel permeation chromatography to be $M_n=2355$ and $M_w=6135$.

This maleic anhydride polymer was then coverted to a a methyl half ester by mixing the following components:

| Components | Parts |
|---|---|
| Maleic anhydride polymer solution (prepared as described above) | 600 |
| Methanol | 24 |

The first component was heated to 50° C. and the methanol component added over a 20-30 minute period. The mixture was then heated to 75-85° C. for five hours or until the arthydride band in the infrared analysis has disappeared (90-95% gone).

EXAMPLE 2

This example illustrates an epoxy silane polymer, more particularly an epoxy functional acrylosilane polymer which was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135-145° C.) | 363.2 |
| Aromatic 100 | 363.2 |
| Portion 2 | |
| Styrene | 530.9 |
| Gamma-Methacryloxypropyl trimethoxy silane | 1380.3 |
| Methyl methacrylate | 318.5 |
| Butyl methacrylate | 79.6 |
| 2-Ethylhexyl acrylate | 79.6 |
| Glycidyl methacrylate | 265.4 |
| Aromatic 100 | 40.9 |
| Xylol | 40.9 |
| Portion 3 | |
| t-Butyl peroxyacetate | 132.7 |
| Aromatic 100 | 99.6 |
| Xylol | 99.7 |
| TOTAL | 3794.5 |

Portion 1 was charged into the polymerization vessel and heated under nitrogen to 149° C. Portion 2 was then added over 360 minutes and Portion 3 was added over 420 minutes to the vessel. The resulting polymer solution had the following characteristics:

| Gallon wt. (lbs/gal) | 8.56 |
|---|---|
| % wt. solids | 72.2 |
| % volume solids | 68.6 |
| $M_w$ of polymer | 5000 |
| $M_n$ of polymer | 1650 |

The polymer composition was, by weight, 20 percent styrene, 52 percent gamma-methacryloxylpropyl trimethoxy silane (A-174 from Union Carbide), 12 percent methyl methacrylate, 3 percent butyl methacrylate, 3 percent 2-ethylhexyl acrylae, and 10 percent glycidyl methacrylate, which may be represented as follows: STY/A-174/MMA/BMA/2-EHA/GMA in the ratio of 20/52/12/3/3/10.

EXAMPLE 3

This example illustrates, as an optional component for a composition according to the present invention, a polyester urethane solution which may be prepared by charging the following constituents in order into a reaction vessel equipped with a stirrer, a heating source and a reflux condenser:

|  | Parts by Weight |
|---|---|
| Portion 1 | |
| 1,3-butylene glycol | 173.4 |
| 1,6-hexanediol | 163.1 |
| Trimethylol propane | 78.8 |
| Adipic acid | 403.7 |
| Toluene | 20.0 |
| Portion 2 | |
| Propylene glycol monomethyl ether acetate | 294.4 |
| Portion 3 | |
| Tone ® FCP 310 (caprolactone polyol from Union Carbide) | 934.9 |
| Propylene glycol monomethyl ether acetate | 185.3 |
| Hydrocarbon solvent | 706.1 |
| Portion 4 | |
| trimethylhexamethylene diisocyanate | 290.3 |
| dibutyl tin dilaurate | 0.5 |
| Portion 5 | |
| Hydrocarbon solvent | 69.8 |
| Total | 3320.3 |

Portion 1 is charged in order into the reaction vessel, and the constituents of Portion 1 are heated to distill water at 140-230° C. The distillation is continued until the acid number is 6.5 to 8.5. The product is thinned and cooled to 98° to 102° C. by charging Portion 2 into the vessel. While the constituents in the vessel are maintained at the above temperature, Portion 3 was charged to the reactor in order. Portion 4 is added to the composition at a uniform rate over a 30 minute period while the batch temperature is maintained at 98°-102° C. A sample is removed and tested for unreacted isocyanate NCO by infrared analysis. The composition is held at the above temperature until there is no unreacted isocyanate in the composition. Portion 5 then is added as a rinse and the resulting composition was allowed to cool to ambient temperatures.

Following this procedure, the resulting composition had a polymer weight solids content of about 61.0%. The polyester urethane had a Gardner-Holdt viscosity of L. The $M_n$ (number average molecular weight) was 3734.0 and the $M_w$ (weight average molecular weight) was 7818.0 (by gel permeation chromatography using polystyrene as the standard). The acid content was determined to be 4.9 Meq/g. The hydroxy number was 92.

EXAMPLE 4

This example illustrates, as another optional component for use in the present composition, an acid polymer, more specifically a methacrylic acid resin, which may be prepared by charging the following constituents into a reactor equipped with a thermometer, stirrer, dropping funnel, and condensor:

|  | Parts by Weight |
|---|---|
| Portion 1 |  |
| Propylene glycol monomethyl ether acetate (hereafter PM acetate) | 155.3 |
| Xylene | 103.5 |
| Portion 2 |  |
| Butyl methacrylate | 174.8 |
| Methacrylic acid | 97.1 |
| Butyl acrylate | 140.8 |
| Styrene | 72.8 |
| Portion 3 |  |
| Tertiary butyl peroxy acetate | 35.0 |
| PM acetate | 41.7 |
| Xylene | 27.8 |
| Total | 849.0 |

Portion 1 was charged into the reactor and heated to reflux (approximately 140° C.). Portion 2 was premixed and added to the reactor dropwise over a 240 minute period. Portion 3 was premixed and added to the reactor over a 270 minute period concurrent with Portion 3. After the addition was complete, the reactor was held at reflux and filled out.

The resulting acid polymer composition had a composition of 15% styrene, 36% butyl methacrylate, 29% n-butyl acrylate, and 20% methacrylic acid. The solids content was 60% and the polymer had a Gardner-Holdt viscosity of Z-1. The polymer had a weight average molecular weight of 5000.

EXAMPLE 5

This example illustrates a waterborne refinish clearcoat composition according to the present invention, using a methyl half ester of maleic anhydride and an epoxy crosslinker. The following components were thoroughly blended:

| Part 1 | Parts by Weight |
|---|---|
| Methyl half ester of maleic anhydride acrylic polymer (as prepared above) | 35.39 |
| Deionized water | 48.91 |
| Triethyl amine | 4.19 |
| DCE 358 (Sorbitol epoxy from Dixie Co.) | 8.9 |
| DABCO (25% triethylene diamine in butanol) | 2.61 |

When the composition was thinned with water and cast as a film on glass, the film cures at ambient temperature. The coating was virtually tack free in approximately 5 hours. After 24 hours, the solvent resistance (to MEK) was measured to 17 double rubs. After 5 days the solvent resistance (to MEK) was measured to 100+ double rubs.

This composition can be fortified with TINUVIN 1130 and TINUVIN 292 (or TINUVIN 123) light stabilizers to give durable films, the level of the former at 2–3% on binder and the level of the latter at 1–2% on binder.

EXAMPLE 6

This example illustrates a waterborne clearcoat composition based on latex and a maleic anhydride half ester copolymer. The following components were thoroughly blended:

| Part 1 | Parts by Weight |
|---|---|
| Methyl half ester of maleic anhydride acrylic polymer (as prepared above but 34% solids in water/butyl proprionate, neutralized with triethylamine) | 88.0 |
| Deionized water | 77.0 |
| Diethylene glycol monobutyl ether | 4.4 |
| Propylene glycol monomethyl ether | 4.4 |
| TINUVIN 1130 UV stabilizer (benzotriazole adduct from Ciba-Geigy) | 2.1 |
| TINUVIN 292 free radical stabilizer (hindered amine from Ciba-Geigy) | 1.4 |
| DEHYDRAN 1620 defoamer (from Henkel) | 0.1 |
| TRITON GR-7M wetting agent (from Union Carbide) | 0.2 |
| NEOCRYL A6015 acrylic emulsion latex (45% solids in water from ICI) | 66.6 |
| triethylene diamine catalyst (25% in water) | 4.3 |
| DCE-358 aliphatic epoxy crosslinker (sorbitol polyglycidol ether from Dixie Chem. Co.) | 10.0 |
| TOTAL | 258.5 |

The resulting coating composition had a solids content of 29% and its calculated VOC is 2.3 lb/gal. The above clear coating composition was drawn over glass plates and allowed to cure for seven days at ambient temperature. The resulting clearcoat had good clarity and gloss, and exhibited a Persoz hardness of 193 and an MEK solvent resistance of 59 double rubs.

EXAMPLE 7

This example illustrates four different compositions (A through D) based on an anhydride half ester and an epoxy, with and without an auxiliarly polyurethane. With respect to each of the compositions A through D, respectively, the following components were thoroughly blended:

| INGREDIENT | A (Parts by weight) | B (Parts by weight) | C (Parts by weight) | D (Parts by weight) |
|---|---|---|---|---|
| PART 1 |  |  |  |  |
| Maleate half ester | 68.73 | 66.61 | 18.67 | 17.45 |
| Deionized H$_2$O | 94.97 | 92.04 | 25.79 | 24.11 |
| Triethylamine | 8.13 | 7.88 | 2.21 | 2.06 |
| Urethane dispersion 1 (NEOREZ ® XR9679) | 0.00 | 0.00 | 138.09 | 0.00 |
| Urethane dispersion 2 (NEOREZ ® XR9699) | 0.00 | 0.00 | 0.00 | 129.06 |
| Butyl carbitol | 0.00 | 0.00 | 0.00 | 14.20 |
| TINUVIN ® 1130 | 1.97 | 2.15 | 2.22 | 2.13 |
| TINUVIN ® 292 | 1.31 | 1.44 | 1.48 | 1.42 |
| DEHYDRAN surfactant | 0.10 | 0.10 | 0.10 | 0.10 |
| DOWANOL PM surfactant | 2.22 | 0.02 | 2.96 | 3.60 |
| TRITON ® surfactant | 0.20 | 0.20 | 0.20 | 0.20 |
| Diethylene triamine catalyst | 5.08 | 4.93 | 1.38 | 1.29 |

| INGREDIENT | A (Parts by weight) | B (Parts by weight) | C (Parts by weight) | D (Parts by weight) |
|---|---|---|---|---|
| (25%) in H₂O | | | | |
| PART 2 | | | | |
| Epoxy (XUGY 358) | 17.28 | 14.78 | 4.14 | 4.39 |
| Epoxy (ARALDITE CY 184) | 0.00 | 9.85 | 2.76 | 0.00 |
| TOTAL | 200.00 | 200.00 | 200.00 | 2.00 |

Part 1 was premixed in order slowly and Part 2 was added with mixing. The final compositions A through D exhibited the following properties.

| | | | | |
|---|---|---|---|---|
| Theoretical Solids | 32.75 | 35.89 | 36.98 | 35/52 |
| Theoretical VOC | 2.90 | 2.60 | 2.40 | 2.40 |
| Viscosity Zahn #2 | 71(3) | 65(4) | 65(4) | Very High |
| Viscosity ICI Cone and Plate | 250 CPS | 175 CPS | 155 CPS | 225 CPS |
| Persoz Hardness 1 Day | | | | |
| Glass | 120 | 60 | | |
| Chroma Base* | 76 | 57 | | |
| Persoz Hardness 3 Day | | | | |
| Glass | 125 | 59 | 107 | 134 |
| Chroma Base | 76 | 54 | 53 | 64 |
| Persoz Hardness 7 Day | | | | |
| Glass | 265 | 198 | 232 | 202 |
| Chroma Base | 114 | 91 | 103 | 118 |
| MEK Resistance (Double Rubs) | | | | |
| Glass | 100+ | 100 | 100+ | 100+ |
| Chroma Base | 50 | 37 | 100+ | 30 |
| Tukon Hardness | | | | |
| 33 Days | 6.30 | 2.98 | 2.71 | 1.60 |
| Hardness Viscosity | | | | |
| Overnight | Gelled | Gelled | Gelled | Fluid |

*Chroma Base is a registered trademark for a solventborne basecoate commercially available from Du Pont Co.

Based on the above results, it is evident that the addition of an auxiliary. polyurethane provides greater strength and hardness. However, with polyesterurethane, using the less reactive epoxy (ether epoxy) in composition C resulted in better properties than using the more reactive epoxy in composition D.

Various modifications, alterations, additions, or substitutions of the components of the composition of this invention will be apparent to those skilled in the art without departing From the scope and spirit of this invention. This invention is not limited to the illustrative embodiments set forth herein, but rather the invention is defined by the following claims.

We claim:

1. A coating composition, in the form of a multipackage system, for producing a clearcoat, said coating composition comprising 20–80% by weight of reactive binder components and 80–20% by weight of an aqueous liquid carrier comprising at least 60% by weight water; wherein the binder comprises:
    (a) 25–90% by weight, based on the weight of the binder, of a half-ester product of an acrylic copolymer having at least two reactive anhydride groups and comprising polymerized monomers of an ethylenically unsaturated arthydride or an ethylenically unsaturated dicarboxylic acid, which has been converted to an anhydride, and polymerized monomers selected from the group consisting of alkyl methacrylate, alkyl acrylate and any mixtures thereof, wherein the alkyl groups have 1–8 carbon atoms and the polymer has a weight average molecular weight of about 2,000–100,000, wherein equal to or greater than 90% of the arthydride groups on said acrylic copolymer have been half-esterifed by reaction with an alcohol;
    (b) 5–50% by weight, based on the weight of the binder, of a glycidyl ether or ester or cycloaliphatic epoxy compound containing at least two reactive glycidyl groups;
    (c) an effective amount of a base to neutralize the half-ester acrylic copolymer (a) above; and
    (d) 0.1–8% by weight, based on the weight of binder, of a curing catalyst, wherein the components are selected such that the composition is capable of forming a clearcoat automotive refinish that can be cured at 10° to 90° C. after being applied, and wherein components (a) and (b) are kept separate in said multi-package system until shortly before application.

2. The coating composition of claim 1, wherein the base is a volatile amine in an amount to solubilize or disperse the half ester product into the aqueous liquid carrier.

3. The coating composition of claim 1, wherein the catalyst is a non-volatile tertiary amine catalyst.

4. The coating composition of claim 1, further comprising a an acrylic latex and/or a waterborne urethane dispersion or emulsion.

5. The coating composition of claim I in which the glycidyl component is selected from the group consisting of a polyglycidyl ether of low molecular weight polyol, an epoxy resin of epichlorohydrin and bisphenol A, a polyglycidyl ester of poly carboxylic acid, a polyglycidyl ether of isocyanurate, a glycidyl methacrylate or glycidyl acrylate containing acrylic polymer, and mixtures of any of the above.

6. The coating compostion of claim 1, further comprising a polyester urethane.

7. The coating composition of claim 1, in which the half ester product is an acrylic polymer comprising polymerized monomers of styrene, alkyl methacrylates and/or alkyl acrylates having 2–4 carbon atoms in the alkyl group, and the half ester of an ethylenically unsaturated arthydride or ethylenically unsaturated dicarboxylic acid which has been converted to an arthydride.

8. The coating composition of claim 1 in which component (a) is the half ester product of an anhydride functional acrylic copolymer comprising polymerized monomers of alkyl acrylate and/or alkyl methacrylate, each akyl having 1-12 carbon atoms, and maleic arthydride.

9. The composition of claim 6, wherein the polyester urethane is the reaction product of a hydroxyl terminated polyester and a polyisocyanate.

10. The coating composition of claim 6, in which the polyester urethane has an acid number of 20 to 120.

11. The coating composition of claim 1, further comprising an acid functional polymer formed by polymerizing monomers of alkyl methacrylates or alkyl acrylates or hydroxy alkyl acrylates or hydroxy alkyl methacrylates or mixtures thereof, where the alkyl groups have 1-12 carbon atoms and ethylenically unsaturated acids.

12. The coating composition of claim 1, further comprising a half ester, in addition to component (a), which is the reaction product of a alcohol or glycol and a monomeric anhydride of a dicarboxylic acid.

13. A substrate coated with a cured layer of the composition of claim 1.

14. The substrate of claim 13, wherein said substrate is plastic or metal.

* * * * *